(12) United States Patent
Horiuchi et al.

(10) Patent No.: US 6,761,843 B2
(45) Date of Patent: Jul. 13, 2004

(54) METHOD FOR MANUFACTURING SYNTHETIC RESIN MOLDINGS

(75) Inventors: Yoshiyasu Horiuchi, Kawasaki (JP); Yasuaki Hirokawa, Kawasaki (JP)

(73) Assignee: Fujitsu General Limited, Kawasaki (JP)

( * ) Notice: Subject to any disclaimer, the term of this patent is extended or adjusted under 35 U.S.C. 154(b) by 133 days.

(21) Appl. No.: 10/087,732

(22) Filed: Mar. 5, 2002

(65) Prior Publication Data

US 2002/0125599 A1 Sep. 12, 2002

(30) Foreign Application Priority Data

Mar. 8, 2001 (JP) ............................. 2001-065491

(51) Int. Cl.$^7$ ............................................. B29C 44/02
(52) U.S. Cl. ................................. 264/53; 264/DIG. 6
(58) Field of Search ....................... 264/DIG. 6, 45.3, 264/53, 911, 918

(56) References Cited

U.S. PATENT DOCUMENTS

| | | | |
|---|---|---|---|
| 3,615,972 A | * 10/1971 | Morehouse et al. | ........... 156/79 |
| 4,108,806 A | * 8/1978 | Cohrs et al. | ................... 521/54 |
| 4,543,106 A | * 9/1985 | Parekh | ......................... 51/295 |
| 5,242,637 A | * 9/1993 | Inoue et al. | ................ 264/45.3 |
| 5,364,683 A | * 11/1994 | Flint et al. | ................... 428/141 |
| 5,565,154 A | * 10/1996 | McGregor et al. | ......... 264/45.4 |
| 5,631,064 A | * 5/1997 | Marecki | ..................... 428/143 |
| 5,888,642 A | * 3/1999 | Meteer et al. | ........... 428/313.5 |
| 6,235,800 B1 | * 5/2001 | Kyuno et al. | .................. 521/51 |
| 6,582,633 B2 | * 6/2003 | Elfving et al. | ................ 264/53 |

\* cited by examiner

*Primary Examiner*—Allan R. Kuhns

(57) ABSTRACT

According to this invention, thermal expansion microcapsules can be substantially evenly mixed with a base resin and an expected expansion coefficient for the thermal expansion microcapsules can be obtained during resin molding in a mold. Specifically, this invention provides a method for manufacturing a synthetic resin molding using thermal expansion microcapsules in which the thermal expansion microcapsules are mixed with a base resin and the mixture undergoes resin molding in a mold, wherein the thermal expansion microcapsules are granulated with a given binder resin under a temperature condition in which the thermal expansion microcapsules are not thermally expanded; then the mixture is mixed with the base resin; and the mixture undergoes resin molding.

6 Claims, No Drawings

METHOD FOR MANUFACTURING SYNTHETIC RESIN MOLDINGS

TECHNICAL FIELD

This invention relates to a method for manufacturing a synthetic resin molding. In particular, it relates to a technique for manufacturing a thick plastic molding using thermal expansion microcapsules.

BACKGROUND ART

Plastic moldings have been applied in any field, and have been supplied in the market in large quantity and inexpensively not only as industrial products but also as general consumer products for improving a level of living.

These plastic moldings have a lower melting point than a metal material and their properties can be easily controlled. They are, therefore, formed by a variety of molding methods. Majority of them are prepared by injection molding or extrusion molding. Generally, they are designed to have a minimal required thickness in the light of a size reduction, a weight reduction and a material cost.

On the other hand, some products must be designed to be thicker in view of their functions, performance or design. For example, a propeller fan used in an outdoor unit in an air conditioner is designed to be thick for improved air-blowing performance such as an increase in air volume and reduced noise.

An increase in thickness by simply increasing the amount of a resin, however, leads to increases of weight and material cost as well as an increase of cooling time during molding. Therefore, expansion molding is often employed. Some known expansion molding techniques will be described.

(1) Chemical foaming; a resin mixed or kneaded with a chemical foaming agent such as azodicarboxylic amide is molded.

(2) Nitrogen gas mixing injection molding; a molding machine (screw cylinder) is filled with nitrogen gas during a melting process to inject with a high speed a kneaded resin material into a mold.

(3) Gas assist method; nitrogen gas is introduced from a nozzle in an injection molding machine or a cavity core in a mold during injection filling to form a cavity in a thick part in a molding.

(4) Core back process; a mobile core preformed in a cavity in a mold is positioned in the front during injection, and after filling a resin material, the core is moved backward while feeding a gas, to form a thick part in a cavity structure.

(5) Thermal expansion microcapsule method; microcapsules are mixed with a resin (base resin) and the mixture is foamed in a mold. In this technique, the thermal expansion microcapsules are fine powder with a particle size of about 0.2 to 0.3 mm, which tend to be separated from resin pellets even after being input with the resin pellets into an injection molding machine. Therefore, a master batch in which thermal expansion microcapsules have been kneaded at a high concentration in advance is prepared and then mixed with a base resin (master batch method).

These molding methods described in (1) to (5) have the following drawbacks. A foamed molding prepared using the molding method described in (1) or (2) tends to have a spiral pattern called as a swirl mark on its surface, often leading to problems of product appearance.

The molding methods described in (3) and (4) are ineffective for foaming of a thin part and tend to generate a number of cavities as voids intensely in thick structure parts. Thus, in these techniques, foaming conditions cannot be easily controlled and a lot of skill is required for designing a mold. In addition, it is extremely difficult to keep an even weight balance for each blade in a rotating body such as a propeller fan.

On the other hand, the thermal expansion microcapsule method described in (5) may be advantageous in that the method little generates a swirl mark; eliminates intense formation of voids in a thick structure part; and allows us to conduct expansion molding only by blending a master batch into a base resin. There are, however, still problems to be solved.

Specifically, while a master batch is prepared from thermal expansion microcapsules, heat history causes pre-expansion before molding so that an expansion coefficient during molding a product is lower than an expected value.

SUMMARY OF THE INVENTION

According to this invention, an expected expansion coefficient of thermal expansion microcapsules can be satisfactorily achieved during molding a resin in a mold.

Thus, this invention provides a method for manufacturing a synthetic resin molding using thermal expansion microcapsules in which the thermal expansion microcapsules are mixed with a base resin and the mixture undergoes resin molding in a mold, wherein the thermal expansion microcapsules are granulated with a given binder resin under a temperature condition in which the thermal expansion microcapsules are not thermally expanded; then the mixture is mixed with the base resin; and the mixture undergoes resin molding.

According to the method of this invention, the thermal expansion microcapsules are granulated without being exposed to heat history above their thermal expansion temperature, i.e., without pre-expansion, so that an expected expansion coefficient can be achieved during molding a resin in a mold.

Thermal expansion microcapsules contain organic solvent (s) such as a low boiling point liquid hydrocarbon. Thus, the granulation process is preferably conducted at a temperature in a range of 80 to 120° C. in the light of avoiding expansion of the solvent and binding action of the binder resin.

For improving miscibility with a base resin with a particle size of about 2 to 3 mm and a length of about 3 to 5 mm, an average particle size of the granulated thermal expansion microcapsules is preferably 7 (particle size: about 2870 mm) to 100 mesh (particle size: about 140 mm). In the granulation process, weatherability additive(s) or pigment(s) may be added as necessary.

A base resin is preferably an olefin resin with a melt flow rate (MFR) of 30 to 90 g/10 min, in order that the resin may be molded at a lower temperature and thermal expansion microcapsules may not be broken during molding.

In molding a resin, a mixture of a base resin and granulated thermal expansion microcapsules may be input into a hopper in an injection molding machine. In such a case, the mixture is preferably input from a vent port in the middle of a cylinder in an injection molding machine for preventing pre-expansion of the thermal expansion microcapsules as much as possible.

In two-material molding, a material to be a core is preferably a recycle resin containing granulated thermal expansion microcapsules, whereby a high-quality product may be provided using more inexpensive materials.

DETAILED DESCRIPTION

In the method of this invention, granulated thermal expansion microcapsules are mixed with a base resin and the mixture undergoes resin molding in a mold. In this embodiment, a molding product is a thick propeller fan for an outdoor unit of an air conditioner.

A thermoplastic resin is used as a base resin, in which a melt flow rate (MFR) is important for preventing the thermal expansion microcapsules from being broken. A preferable resin is an olefin resin with an MFR of 30 to 90 g/10 min which can be molded at a low temperature.

Thus, the thermal expansion microcapsules may be consistently kneaded with a base resin without damage in the cells of the thermal expansion microcapsules owing to a higher flowability and viscosity of the resin. An example of a suitable base resin may be a polypropylene J-6083HP (Idemitsu Petrochemical Co., Ltd.) with an MFR of 60 g/10 min.

For two-material molding (sandwich molding), a recycled polypropylene may be used as a material to be a core, to provide an environment-friendly molding with a low cost while retaining required properties.

Thermal expansion microcapsules may be, for example, made of a low boiling point hydrocarbon coated with an acrylic resin, preferably with an average particle size of 20 to 35 mm, an expansion ratio of 3 to 5 folds as an outer diameter ratio and about 30 to 60 folds as a volume ratio, and an expansion temperature of about 180° C. In this embodiment, thermal expansion microcapsules F-100D and F-110D (Matsumoto Yushi-Seiyaku Co., Ltd.) were employed.

The thermal expansion microcapsules may be mixed with a binder resin using, e.g., the MC coloring autometer from TOWA Chemical Co., Ltd. to provide granules with an average particle size of 7 mesh (about 2870 mm) to 100 mesh (about 140 mm).

A binder resin used for this granulation process is preferably polypropylene powder (e.g., M-1500, Asahi Chemical Industry Co., Ltd.). Some types of binder resin may be granulated at an ambient temperature while, when heating is needed during granulation, a temperature is preferably in a range of 80 to 120° C., i.e., below a temperature at which expansion of the thermal expansion microcapsules is initiated.

Then, the granulated thermal expansion microcapsules were blended with a base resin and the mixture was input into an injection molding machine for molding a thick propeller fan, which will be described. In this process, a commonly used injection molding machine was employed. A cylinder temperature was adjusted to about 180° C., which is slightly lower than a melting point of a common resin and the thermal expansion microcapsules exhibit a peak expansion.

A mold for a thick molding with a thickness of about 5 mm to 30 mm was used and a mold temperature during injection was adjusted to a relatively lower temperature of about 20 to 30° C. The injection was completed as quickly as possible such that the mold was instantly filled with the resin. A holding time was selected such that a pressure was little applied and adjusted to prevent the capsules from being damaged without retarding expansion.

In melt plastication metering for the material, rotation of the cylinder was set to a similar or slightly lower value than a common value, and a back pressure was appropriately controlled to reduce expansion within the cylinder as much as possible.

For further controlling pre-expansion (preliminary expansion) of thermal expansion microcapsules, the thermal expansion microcapsules are preferably input from a vent port in the middle of a cylinder in an injection molding machine. Thus, the materials may be mixed without giving heat history to the thermal expansion microcapsules by the time immediately before injection molding.

A thick propeller fan thus manufactured exhibits the following effects. The thermal expansion microcapsules are evenly expanded in a base resin so that the product may be of a low density and a light weight and a duty to a motor may be reduced. As a result, a required power may be reduced and a duty to a motor shaft and a bearing may be reduced.

In a common expansion molding, an appearance may be deteriorated due to formation of some swirl mark on a surface. In contrast, according to the expansion molding of this invention, a skin layer is smooth so that a properly glossy outer surface comparable to a solid molding can be provided, resulting in an improved commercial value.

Furthermore, since an expansion coefficient can be easily controlled, generation of a sink mark associated with cooling shrinkage of a resin is eliminated so that a three-dimensional curved surface shape in a propeller fan can be exactly expressed.

A reduction in the required amount of a resin may lead to a reduced heat capacity for cooling within a mold. Additionally, an expanded material is strongly pushed on a cavity surface in a mold so that heat transfer to the mold may be improved and thus cooling may be accelerated. It may result in reduction in cooling time and cycle time.

In the method of this invention, thermal expansion microcapsules are not preliminarily expanded by heat history in contrast to the method in which a master batch is prepared from thermal expansion microcapsules. An amount of a base resin added may be, therefore, reduced.

Meanwhile, in a master batch method, a soft elastomer is used to pelletize thermal expansion microcapsules. The method, therefore, requires heating at 120° C. or higher, which may cause some pre-expansion. In addition, the presence of an elastomer may deteriorate the physical properties of a base resin, while such problems can be eliminated in the method of this invention.

In addition to a thick propeller fan as described above, this invention may be also applied to manufacturing, for example, an armrest for a chair, a door handle for an automobile, a handle for a refrigerator or a thick sole.

This invention has been more specifically described with reference to some embodiments. It will be, however, understood that the scope of this invention as defined in claims can encompass variations, modifications and equivalent techniques by the skilled in the art who have understood the above description.

What is claimed is:

1. A method for manufacturing a synthetic resin molding, comprising:
    affixing a binder resin to thermal expansion microcapsules at a temperature such that the thermal expansion microcapsules do not expand to thereby form granulated microcapsules with an average particle diameter of 140-2, 870 $\mu$m,
    mixing the granulated thermal expansion microcapsules with a base resin, and
    molding a mixture of the granulated thermal expansion microcapsules and the base resin in a mold.

2. The method for manufacturing a synthetic resin molding according to claim 1, wherein the temperature is in a range of 80 to 120° C.

3. The method for manufacturing a synthetic resin molding according to claim 1, wherein the base resin is an olefin resin with a melt flow rate (MFR) of 30 to 90 g/10 min.

4. The method for manufacturing a synthetic resin molding according to claim 1, wherein said base resin has a pellet shape.

5. The method for manufacturing a synthetic resin molding according to claim 1, wherein said thermal expansion microcapsules are granulated at a temperature between 80 and 120° C. such that low boiling point hydrocarbon containing in the thermal expansion microcapsules does not expand.

6. The method for manufacturing a synthetic resin molding according to claim 5, wherein each of said thermal expansion microcapsules is formed of said low boiling point hydrocarbon coated with an acrylic resin and has an average diameter of 20–35 $\mu$m.

* * * * *